US011984072B2

United States Patent
(12) United States Patent
Yuan et al.

(10) Patent No.: US 11,984,072 B2
(45) Date of Patent: May 14, 2024

(54) DISPLAY SUBSTRATE AND DESIGN METHOD THEREFOR, AND DISPLAY APPARATUS

(71) Applicants: Hefei BOE Joint Technology Co., Ltd., Anhui (CN); BOE Technology Group Co., Ltd., Beijing (CN)

(72) Inventors: Can Yuan, Beijing (CN); Yongqian Li, Beijing (CN); Zhidong Yuan, Beijing (CN)

(73) Assignees: Hefei BOE Joint Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/921,911

(22) PCT Filed: Jun. 3, 2021

(86) PCT No.: PCT/CN2021/098090
§ 371 (c)(1),
(2) Date: Oct. 27, 2022

(87) PCT Pub. No.: WO2021/249273
PCT Pub. Date: Dec. 16, 2021

(65) Prior Publication Data
US 2023/0178014 A1 Jun. 8, 2023

(30) Foreign Application Priority Data
Jun. 12, 2020 (CN) ......................... 202010538367.4

(51) Int. Cl.
*G09G 3/3225* (2016.01)

(52) U.S. Cl.
CPC ... *G09G 3/3225* (2013.01); *G09G 2300/0819* (2013.01); *G09G 2300/0842* (2013.01);
(Continued)

(58) Field of Classification Search
CPC .. G09G 3/3225; G09G 3/3275; G09G 3/3611; G09G 3/3685; G09G 3/3688;
(Continued)

(56) References Cited

U.S. PATENT DOCUMENTS 5,235,448 A * 8/1993 Suzuki .................. G02F 1/1368 349/85
10,147,360 B2 * 12/2018 Hack .................... G09G 3/3275
(Continued)

FOREIGN PATENT DOCUMENTS

CN 1702727 A 11/2005
CN 101021998 A 8/2007
(Continued)

OTHER PUBLICATIONS

CN202010538367.4 first office action.
PCT/CN2021/098090 international search report.

*Primary Examiner* — Mihir K Rayan
(74) *Attorney, Agent, or Firm* — IPro, PLLC

(57) ABSTRACT

A display substrate (100) and a design method therefor, and a display apparatus. The display substrate (100) includes: pixel circuits which are arranged in an array, where the pixel circuits are divided into at least two areas; and data switching circuits (10), which are correspondingly connected to the pixel circuits in the areas by means of data signal lines, wherein a channel width-to-length ratio (W/L) of a switch device in each data switching circuit (10) is positively correlated with a design data load of an area corresponding to the data switching circuit (10). The width-to-length ratios (W/L) of different switch devices can be matched according to different design data loads of different areas.

18 Claims, 5 Drawing Sheets

(52) U.S. Cl.
CPC ............... *G09G 2310/0297* (2013.01); *G09G 2320/0219* (2013.01); *G09G 2320/0223* (2013.01); *G09G 2320/0233* (2013.01)

(58) Field of Classification Search
CPC ... G09G 2300/0842; G09G 2300/0469; G09G 2300/0804; G09G 2300/0814; G09G 2320/0233; G09G 3/3233; G09G 3/3208
See application file for complete search history.

(56) References Cited

U.S. PATENT DOCUMENTS

| | | | | |
|---|---|---|---|---|
| 10,957,266 | B2 * | 3/2021 | Takahashi | G11C 19/287 |
| 2005/0265400 | A1 | 12/2005 | Shin | |
| 2005/0269959 | A1 * | 12/2005 | Uchino | G02B 6/4268 315/169.3 |
| 2007/0152920 | A1 | 7/2007 | Yamashita et al. | |
| 2009/0033817 | A1 * | 2/2009 | Ooida | G02F 1/1368 349/43 |
| 2010/0141570 | A1 * | 6/2010 | Horiuchi | G11C 19/28 345/100 |
| 2011/0096258 | A1 * | 4/2011 | Shim | H01L 27/1255 438/34 |
| 2014/0307004 | A1 | 10/2014 | Roh | |
| 2015/0187432 | A1 | 7/2015 | Jinta | |
| 2015/0379934 | A1 | 12/2015 | Xiaoling | |
| 2016/0125844 | A1 | 5/2016 | Lee | |
| 2016/0351120 | A1 | 12/2016 | Itakura | |
| 2018/0102090 | A1 | 4/2018 | Han | |
| 2019/0140036 | A1 * | 5/2019 | Hyeon | H10K 77/111 |
| 2019/0371251 | A1 | 12/2019 | Fan et al. | |
| 2020/0035166 | A1 | 1/2020 | Zhu et al. | |
| 2021/0166628 | A1 | 6/2021 | Huang et al. | |
| 2023/0005410 | A1 | 1/2023 | Wei et al. | |

FOREIGN PATENT DOCUMENTS

| | | | |
|---|---|---|---|
| CN | 103700347 | A | 4/2014 |
| CN | 105679243 | A | 6/2016 |
| CN | 108447439 | A | 8/2018 |
| CN | 108492775 | A | 9/2018 |
| CN | 108803172 | A | 11/2018 |
| CN | 108877658 | A | 11/2018 |
| CN | 109036280 | A | 12/2018 |
| CN | 110989255 | A | 4/2020 |
| CN | 111261640 | A | 6/2020 |
| CN | 111583865 | A | 8/2020 |

* cited by examiner

DISPLAY SUBSTRATE AND DESIGN METHOD THEREFOR, AND DISPLAY APPARATUS

CROSS REFERENCE TO RELATED APPLICATIONS

The present disclosure claims priority to the Chinese Patent Application No. 202010538367.4, filed to China Patent Office on Jun. 12, 2020, and entitled "DISPLAY PANEL, DISPLAY APPARATUS AND METHOD FOR DETERMINING CHANNEL WIDTH-TO-LENGTH RATIO OF SWITCH DEVICE", the entire content of which is incorporated herein by reference.

FIELD

The present disclosure relates to the technical field of display substrates, in particular to a display substrate and a design method therefor, and a display apparatus.

BACKGROUND

Currently, organic light-emitting diode (OLED) display products are diversified, customized specially shaped products are increasingly popular, and a specially shaped display screen is becoming a trend.

However, different regions of a customized specially shaped product vary in data payload, which results in different voltage loss of data signals. Such difference is particularly obvious in specially shaped display substrates in medium and large sizes, and is prone to causing a problem of uneven brightness of a screen, therefore affecting a display effect.

SUMMARY

In a first aspect, an embodiment of the present disclosure provides a display substrate, including:

- pixel circuits arranged in an array, where the pixel circuits are arranged in at least two regions; and
- data switching circuits correspondingly connected to the pixel circuits in the at least two regions via data signal lines;
- where a channel width-to-length ratio of each of switch devices in each of the data switching circuits is positively correlated with a design data payload of a region corresponding to the each data switching circuit.

In one possible implementation, the display substrate is a specially shaped substrate; and at least two regions in the specially shaped substrate include at least one of: different shapes, different areas or different curvatures.

In one possible implementation, the design data payload of the region is positively correlated with a parasitic capacitance of each of the switch devices, the parasitic capacitance of the each switch device is a result of a first result divided by a second result, the first result is a result of a voltage loss of a data signal output by a data signal line multiplied by a parasitic capacitance on the data signal line, and the second result is a result of a voltage difference between a high level and a low level of the data signal minus the voltage loss of the data signal.

In one possible implementation, one region includes at least two data signal lines, one of the data signal lines is electrically connected to one column of the pixel circuits, one data switching circuit includes at least two switch devices, and each of the switch devices are equal in the channel width-to-length ratio.

In one possible implementation, one region includes a first data signal line, a second data signal line, a first pixel circuit electrically connected to the first data signal line, and a second pixel circuit electrically connected to the second data signal line;

- each data switching circuit includes: a first switch device and a second switch device;
- the first switch device is electrically connected to the first pixel circuit through the first data signal line; and
- the second switch device is electrically connected to the second pixel circuit through the second data signal line.

In one possible implementation, a control end of the first switch device is electrically connected to a first control signal line, a first end of the first switch device is electrically connected to a data input line, and a second end of the first switch device is electrically connected to the first data signal line; and

- a control end of the second switch device is electrically connected to a second control signal line, a first end of the second switch device is electrically connected to the data input line, and a second end of the second switch device is electrically connected to the second data signal line.

In one possible implementation, one pixel circuit includes: a first switch circuit, a second switch circuit, a third switch circuit, a driving circuit, a light emitting control circuit, a storage device and a light emitting device;

- a control end of the first switch circuit is electrically connected to a third control signal line, a first end of the first switch circuit is electrically connected to one of the data signal lines, and a second end of the first switch circuit is electrically connected to a first node;
- a control end of the second switch circuit is electrically connected to a fourth control signal line, a first end of the second switch circuit is electrically connected to a first initialization signal line, and a second end of the second switch circuit is electrically connected to the first node;
- a control end of the third switch circuit is electrically connected to a fifth control signal line, a first end of the third switch circuit is electrically connected to a second initialization signal line, and a second end of the third switch circuit is electrically connected to a second node;
- a control end of the driving circuit is electrically connected to the first node, a first end of the driving circuit is electrically connected to a second end of a first light emitting control circuit, and a second end of the driving circuit is electrically connected to the second node;
- a control end of the light emitting control circuit is electrically connected to a sixth control signal line, and a first end of the light emitting control circuit is electrically connected to a first level end;
- a first end of a charge storage device is electrically connected to the first node, and a second end of the charge storage device is electrically connected to the second node; and
- an anode of the light emitting device is electrically connected to the second node, and a cathode of the light emitting device is electrically connected to a second level end.

In one possible implementation, the first switch circuit includes a third switch device, a control end of the third switch device serves as the control end of the first switch circuit, a first end of the third switch device serves as the first end of the first switch circuit, and a second end of the third switch device serves as the second end of the first switch circuit;

the second switch circuit includes a fourth switch device, a control end of the fourth switch device serves as the control end of the second switch circuit, a first end of the fourth switch device serves as the first end of the second switch circuit, and a second end of the fourth switch device serves as the second end of the second switch circuit;

the third switch circuit includes a fifth switch device, a control end of the fifth switch device serves as the control end of the third switch circuit, a first end of the fifth switch device serves as the first end of the third switch circuit, and a second end of the fifth switch device serves as the second end of the third switch circuit;

the driving circuit includes a sixth switch device, a control end of the sixth switch device serves as the control end of the driving circuit, a first end of the sixth switch device serves as the first end of the driving circuit, and a second end of the sixth switch device serves as the second end of the driving circuit;

the light emitting control circuit includes a seventh switch device, a control end of the seventh switch device serves as the control end of the light emitting control circuit, a first end of the seventh switch device serves as the first end of the light emitting control circuit, and a second end of the seventh switch device serves as the second end of the light emitting control circuit; and the charge storage device includes a capacitor, a first end of the capacitor serves as the first end of the charge storage device, and a second end of the capacitor serves as the second end of the charge storage device.

In one possible implementation, each switch device is a thin film transistor;

the control end of each switch devices is a gate of the thin film transistor; and the first end of each switch device is a drain electrode of the thin film transistor, and the second end of each switch device is a source electrode of the thin film transistor; or the first end of each switch device is a source electrode of the thin film transistor, and the second end of each switch device is a drain electrode of the thin film transistor.

In a second aspect, an embodiment of the present disclosure further provides a display apparatus, including: the display substrate according to the first aspect.

In a third aspect, an embodiment of the present disclosure further provides a design method of the display substrate according to the first aspect, including:

determining, according to a design data payload of each of the at least two regions in the pixel circuits, the channel width-to-length ratio of each of the switch devices in a data switching circuit corresponding to the each region.

In one possible implementation, the determining the channel width-to-length ratio of the each switch device in the data switching circuit corresponding to the each region includes:

determining a parasitic capacitance of the each switch device, where the parasitic capacitance of the each switch device is a result of a first result divided by a second result, the first result is a result of a voltage loss of a data signal output by a data signal line multiplied by a parasitic capacitance on the data signal line, the second result is a result of a voltage difference between a high level and a low level of the data signal minus the voltage loss of the data signal, and the switch devices include a first switch device and a second switch device; and determining the width-to-length ratio of the each switch device according to a positive correlation coefficient between the channel width-to-length ratio of the each switch device and the parasitic capacitance of the each switch device.

DETAILED DESCRIPTION OF THE EMBODIMENTS

The present disclosure will be described in detail below, and examples of embodiments of the present disclosure are illustrated in the accompanying drawings. The same or similar labels throughout represent the same or similar component or a component with the same or similar function. In addition, if any detailed description to any known technology is unnecessary to an illustrated feature of the present disclosure, such decryption will be omitted. The embodiments described below with reference to the accompanying drawings are used as examples. These embodiments are merely used to explain the present disclosure and shall not be interpreted as limitation to the present disclosure.

Those of skill in the art may understand that, unless as otherwise defined, all terms used herein (including technical terms and scientific terms) have the common meaning generally understood by those of ordinary skill in the art to which the present disclosure belongs. It should further be understood that those terms defined in a general dictionary should be understood as having the meanings consistent with the meanings in the context of the related art. Unless as specifically defined here, such terms will not be explained into any idealized or excessively meanings.

Those of skill in the art may understand that, unless as specifically stated, singular forms used herein, including "one", "a", "said" and "such", may include plural forms as well. It should further be understood that the wording "include" used in the specification of the present disclosure refers existence of a feature, an integer, a step, an operation, an element and/or an assembly, without excluding the existence or addition of one or a plurality of other features, integers, steps, operations, elements, assemblies and/or a combination thereof. It should be understood that when we call an element "connected" or "coupled" to another element, it may be directly connected or coupled to the other element, or there may be an intermediate element. In addition, "connection" or "coupling" used herein may include wireless connection or wireless coupling. The wording "and/or" used herein includes one or a plurality relevant listed items or a combination of any one or all of these listed items.

Technical solutions of the present disclosure as well as how the technical solutions of the present disclosure solve the above technical problem will be described in detail below through specific embodiments.

Figure 1:
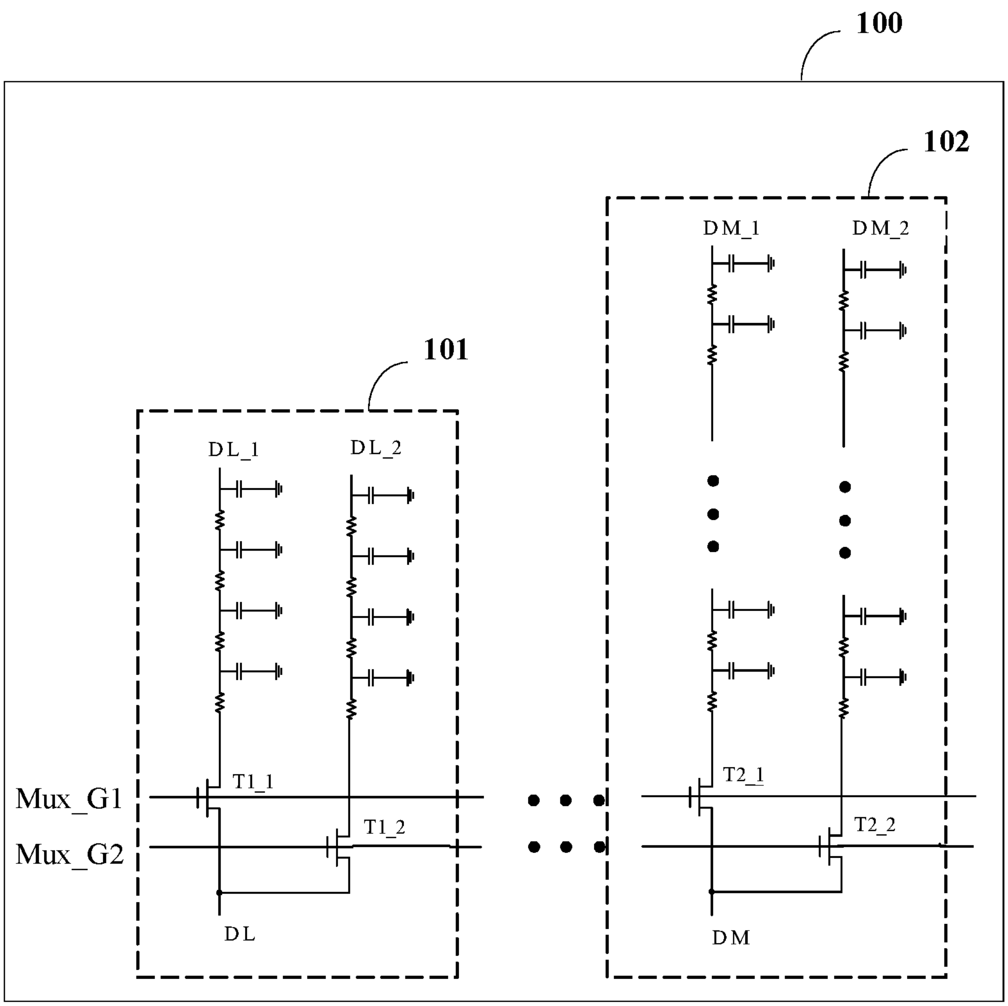
FIG. 1 is a schematic structural diagram of a display substrate provided by an embodiment of the present disclosure, mainly illustrating a structure of a maximum design data payload region and a minimum design data payload region.
Figure 2:
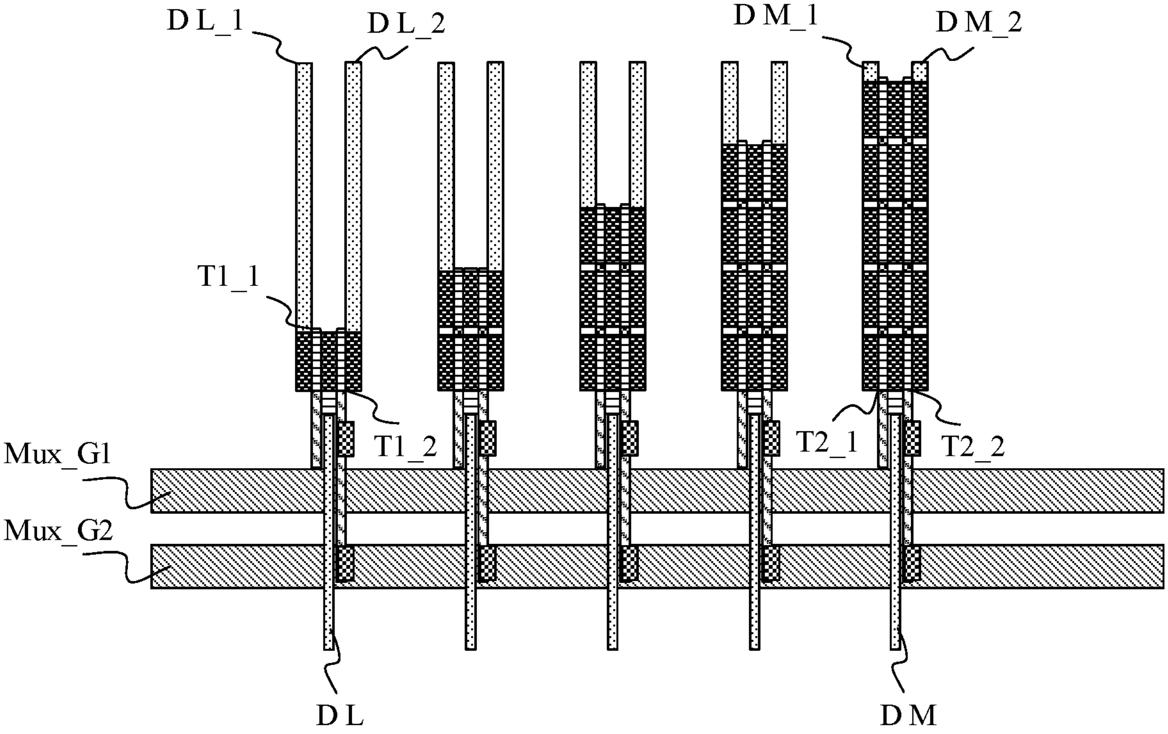
FIG. 2 is a layout of a display substrate provided by an embodiment of the present disclosure, mainly illustrating width-to-length ratios of different switch devices matching a plurality of different design data payload regions.
Figure 3:
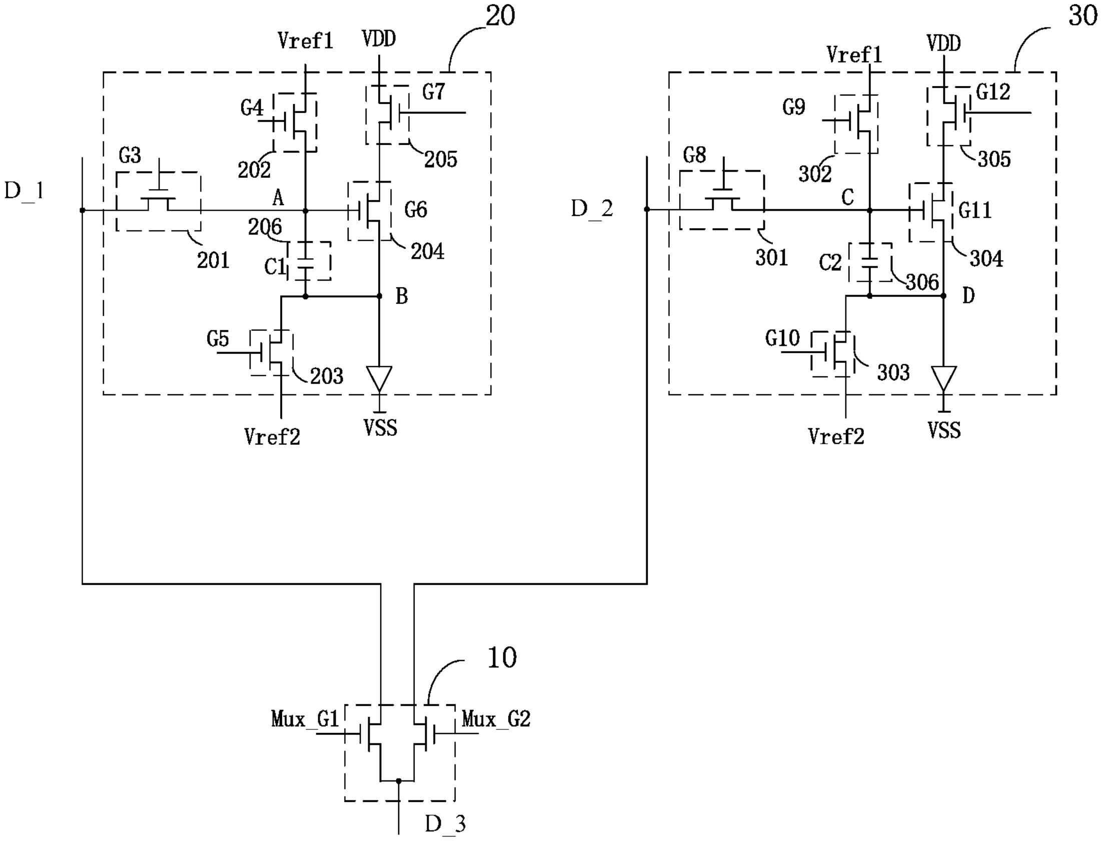
FIG. 3 is a schematic structural diagram of a pixel circuit of a display substrate provided by an embodiment of the present disclosure.

Embodiments of the present disclosure provide a display substrate. As shown in FIG. 1 to FIG. 3, the display substrate 100 includes: pixel circuits arranged in an array; the pixel circuits are located in at least two regions; data switching circuits are correspondingly connected to the pixel circuits in the at least two regions via data signal lines; and a channel width-to-length ratio W/L of each of switch devices in each of the data switching circuits is positively correlated with a design data payload of a region corresponding to the data switching circuit. Specifically, W represents a width of each switch device, and L represents a length of each switch device. The data payload (data loading) includes a payload formed by a resistor R and a capacitor C of a data signal line for outputting a data signal, and may cause a loss of voltage of the data signal. Data signal lines of regions of a specially shaped display substrate vary in length, so the data payloads may be different. The data payload of a designed specially shaped display substrate is known, i.e. a design data payload.

As shown in FIG. 1, the display substrate 100 includes a first region 101 and a second region 102, and the pixel circuits are arranged correspondingly in the first region 101 and the second region 102. A specific structure of each pixel circuit is a circuit structure 20 and 30 shown in FIG. 3. Specifically, the first region 101 is a minimum data payload region, and the second region 102 is a maximum data payload region. In practical application, a plurality of regions with different data payloads may be divided according to a design of a structure of the display substrate 100, to match the corresponding switch devices.

The data signal in the embodiments of the present disclosure is output by each switch device, when the switch device is turned off, an written grayscale is coupled and pulled down, so a part of the grayscale is lost, i.e. a voltage of the data signal is lowered. Because the specially shaped display substrate has an irregular shape, the regions vary in data payload, and the voltage losses of the data signal are different. In the embodiments of the present disclosure, the channel width-to-length ratio of each switch device in each data switching circuit is positively correlated with the design data payload of the region corresponding to the data switching circuit, so different switch devices may be matched according to different design data payloads of different regions. Therefore, a grayscale integrity is ensured, and technical support is provided for display of a customized specially shaped product.

In some embodiments, the display substrate 100 is a specially shaped substrate, and at least two regions in the specially shaped substrate include at least one of the followings: different shapes, different areas or different curvatures. Because the at least two regions in the specially shaped substrate are different in shape, area or curvature, the data payloads of the at least two regions are different, and different switch devices are matched according to different design data payloads of different regions, i.e. the width-to-length ratios W/L of the switch devices in different regions are matched, which may ensure that under the same grayscale, the pixel circuits have the same written grayscale.

In some embodiments, the design data payload of each region is positively correlated with a parasitic capacitance of the switch device; and the parasitic capacitance of the switch device is a result of a first result divided by a second result. The first result is a result of the voltage loss of the data signal output by the data signal line multiplied by a parasitic capacitance on the data signal line, and the second result is a result of a voltage difference between a high level and a low level of the data signal minus the voltage loss of the data signal.

The inventor of the present disclosure considers that, because there is the parasitic capacitance in the switch device itself, the parasitic capacitance has direct proportion to the width W of the switch device. For customized specially shaped products in medium and large sizes, a difference in payloads formed by the resistors R and the capacitors C of the data signal lines is relatively large. A longer data signal line leads to a larger payload formed by the resistor R and the capacitor C. In practical application, the lengths L of switch devices are fixed, and different switch devices are designed and matched based on changes of the widths W.

To take a maximum payload caused by the resistor R and the capacitor C of the data signal line as a basis, a driving ability and the width-to-length ratio W/L of the switch device are relatively large. In a region with a relatively small data payload, a grayscale loss ΔVdata may exist when the switch device is turned off to cause capacitor coupling. The grayscale loss ΔVdata is obtained according to the following formula (1):

$$\Delta Vdata=(\Delta U\times Cgs\_tft)/(Cdata+Cgs\_tft) \quad \text{formula (1).}$$

Where: Cgs_tft is the parasitic capacitance of the switch device, and as shown in FIG. 3, a data switching circuit 10 may include a first switch device Mux_G1 and a second switch device Mux_G2; ΔU is the voltage difference between the high level and the low level of the data signal; Cdata is the parasitic capacitance on the data signal line; and ΔVdata is the voltage loss of the data signal caused when the switch device is turned off.

Specifically, it can be seen from formula (1) that, if the data signal lines are different and the switch device is designed with the region with the maximum data payload as a basis, the grayscale loss ΔVdata of a region with the minimum data payload is relatively large, and finally uneven brightness will be caused.

Based on conversion of formula (1), the parasitic capacitance Cgs_tft of the switch device may be obtained, and the parasitic capacitance Cgs_tft is obtained according to the following formula (2):

$$Cgs\_tft=(\Delta Vdata\times Cdata)/(\Delta U-\Delta Vdata) \quad \text{formula (2).}$$

Because ΔU, ΔVdata and Cdata may all be obtained, the parasitic capacitance Cgs_tft may be obtained through calculation, and the channel width-to-length ratio of the switch device may be determined according to a preset positive correlation coefficient between the channel width-to-length ratio W/L of the switch device and the parasitic capacitance Cgs_tft of the switch device. In practical application, the preset positive correlation coefficient is related to a manufacturing process of the switch device, and can be determined according to the actual manufacturing process of the switch device.

Optionally, one region may include at least two data signal lines, one of the data signal lines is electrically connected to one column of the pixel circuits, one data switching circuit includes at least two switch devices, and each of the switch devices are equal in channel width-to-length ratio.

For example, the switch devices include the first switch device Mux_G1 and the second switch device Mux_G2, a first data signal line D_1 and a second data signal line D_2 in the region connected to the first switch device Mux_G1 and the second switch device Mux_G2 have little difference in length, data signals output by the first data signal line D_1 and the second data signal line D_2 may be the same or may be different, and the first switch device Mux_G1 and the second switch device Mux_G2 in the same region have little difference in width-to-length ratio.

In some embodiments, one region includes the first data signal line D_1, the second data signal line D_2, a first pixel circuit 20 and a second pixel circuit 30. A signal switching circuit 10 includes the first switch device Mux_G1 and the second switch device Mux_G2. The first switch device Mux_G1 is electrically connected to the first pixel circuit 20 through the first data signal line D_1. The second switch device Mux_G2 is electrically connected to the second pixel circuit 30 through the second data signal line D_2. The channel width-to-length ratios of the first switch device Mux_G1 and the second switch device Mux_G2 are positively correlated with the design data payload of the region corresponding to the pixel circuits.

Optionally, the design data payload of the region includes design data payloads of the data signal lines. The data signal lines include the first data signal line D_1 and the second data signal line D_2. The width-to-length ratio of the first switch device Mux_G1 is positively correlated to the design data payload of the first data signal line D_1, and the width-to-length ratio of the second switch device Mux_G2 is positively correlated to the design data payload of the second data signal line D_2. The design data payload of each data signal line is correlated to the length of the data signal line. A longer data signal line corresponds to a larger design data payload.

The inventor of the present disclosure considers that, for the specially shaped display substrate, in order to save data signal lines in an integrated circuit to reduce a cost, one data input line is subjected to frequency multiplication division into two data signal lines. By turning on and turning off two switch devices, different data signals are switched and matched, so normal writing of grayscales of two different pixel circuits may be ensured.

Based on the above analysis, in some embodiments, a control end of the first switch device Mux_G1 is electrically connected a first control signal line, a first end of the first switch device Mux_G1 is electrically connected to a data input line D_3, and a second end of the first switch device Mux_G1 is electrically connected to the first data signal line D_1. A control end of the second switch device Mux_G2 is electrically connected to a second control signal line, a first end of the second switch device Mux_G2 is electrically connected to the data input line D_3, and a second end of the second switch device Mux_G2 is electrically connected to the second data signal line D_2.

Specifically, data signals of the data input line D_3 are respectively controlled by the first switch device Mux_G1 and the second switch device Mux_G2. The data signals may be grayscale signals with the same color or different colors.

As an example, as shown in FIG. 1, FIG. 2 and FIG. 3, in the two regions in the specially shaped display substrate in the embodiments of the present disclosure, the first region 101 on the left in the drawing is the minimum data payload region, and the second region 102 on the right in the drawing is the maximum data payload region. In the embodiments, in the minimum data payload region, the data signal line DL corresponds to the data input line D_3, the data signal line DL_1 and the data signal line DL_2 correspond to the first data signal line D_1 and the second data signal line D_2 respectively, and the switch devices T1_1 and T1_2 correspond to the first switch device Mux_G1 and the second switch device Mux_G2 respectively. In the minimum data payload region, a data payload formed by the resistors R and the capacitors C on the data signal line DL_1 and the data signal line DL_2 is minimum.

In the maximum data payload region, the data signal line DM corresponds to the data input line D_3, the data signal line DM_1 and the data signal line DM_2 correspond to the first data signal line D_1 and the second data signal line D_2 respectively, and the switch devices T2_1 and T2_2 correspond to the first switch device Mux_G1 and the second switch device Mux_G2 respectively. A data payload formed by the resistors R and the capacitors C on the data signal line DM_1 and the data signal line DM_2 is maximum.

In a multi-segment data payload matching design, on the basis of magnitudes of the data payloads, the corresponding switch devices T1_1 and T1_2 and the width-to-length ratios W/L of the switch devices T2_1 and T2_2 are matched, so as to solve the problem of grayscale loss caused because the first switch device Mux_G1 and the second switch device Mux_G2 are coupled due to the parasitic capacitance.

As shown in FIG. 2, with the increase of the data payload, the width-to-length ratios W/L of the first switch device Mux_G1 and the second switch device Mux_G2 are increased correspondingly. Specifically, in each region, under a circumstance that the first switch device Mux_G1 and the second switch device Mux_G2 remain unchanged in length, widths of the first switch device Mux_G1 and the second switch device Mux_G2 are correspondingly increased.

The inventor of the present disclosure has respectively tested data signals in a minimum data payload region and a maximum data payload region of a display substrate in the prior art as well as data signals in the minimum data payload region and the maximum data payload region of the display substrate 100 of the present disclosure.

In the prior art, in the minimum data payload region, to take a test result of the data signal of the data signal line DL_1 as an example, a target data signal is 8V. When the first switch device Mux_G1 is turned off, because of the existence of the data payload, a voltage of the target data signal is pulled down; with the increase of a parasitic capacitance C of the first switch device Mux_G1, data signals actually output by the data signal line DL_1 are: 7.76914, 7.54447, 7.52902, 7.49018, 7.48551, and 7.44577; and the grayscale loss is between 0.23V and 0.55V. In the maximum data payload region, to take a test result of the data signal of the data signal line DM_1 as an example, a target data signal is 8V. When the first switch device Mux_G1 is turned off, with the increase of the parasitic capacitance C of the first switch device Mux_G1, data signals actually output by the data signal line DL_1 are: 7.96259, 7.96122, 7.95653, 7.95252, 7.93368, and 7.9217; and the grayscale loss is between 0.04V and 0.08V. The difference in grayscale losses of the maximum data payload region and the minimum data payload region will cause poor evenness of brightness.

Through the test of the related art, when the width-to-length ratios W/L of the first switch devices Mux_G1 are the same in the minimum data payload region and the maximum data payload region. That is, the width-to-length ratios of the switch devices are not matched according to different regions, so the voltage of the data signal in the maximum data payload region is pulled down by a relatively small extent, but there is a problem that the voltage of the data signal in the minimum data payload region is pulled down by a relatively large extent.

Based on the embodiments of the present disclosure, after different switch devices are matched in different data payload regions, that is, the width-to-length ratio of the first switch device Mux_G1 is adjusted, data signal actually output by the data signal line DL_1 are: 7.93396, 7.84908, 7.83685, 7.81961, and 7.80465; and the grayscale loss may be reduced to 0.07V, so brightness difference caused by grayscale loss is successfully reduced and brightness evenness of products is further improved.

In some embodiments, as shown in FIG. 3, the first pixel circuit 20 includes: a first switch circuit 201, a second switch circuit 202, a third switch circuit 203, a first driving circuit 204, a first light emitting control circuit 205, and a first charge storage device 206;

- a control end of the first switch circuit 201 is electrically connected to a third control signal line, a first end of the first switch circuit 201 is electrically connected to the first data signal line D_1, and a second end of the first switch circuit 201 is electrically connected to a first node A;
- a control end of the second switch circuit 202 is electrically connected to a fourth control signal line, a first end of the second switch circuit 202 is electrically connected to a first initialization signal line Vref1, and a second end of the second switch circuit 202 is electrically connected to the first node A;
- a control end of the third switch circuit 203 is electrically connected to a fifth control signal line, a first end of the third switch circuit 203 is electrically connected to a second initialization signal line Vref2, and a second end of the third switch circuit 203 is electrically connected to a second node B;
- the second node B is electrically connected to an anode of a first light emitting device, and a cathode of the first light emitting device is electrically connected to a second level end VSS;
- a control end of the first driving circuit 204 is electrically connected to the first node A, a first end of the first driving circuit 204 is electrically connected to a second end of the first light emitting control circuit 205, and a second end of the first driving circuit 204 is electrically connected to the second node B;
- a control end of the first light emitting control circuit 205 is electrically connected to a light emitting control signal line EM, and a first end of the first light emitting control circuit 205 is electrically connected to a first level end VDD; and
- a first end of the first charge storage device 206 is electrically connected to the first node A, and a second end of the first charge storage device 206 is electrically connected to the second node B.

In some embodiments, as shown in FIG. 3, the second pixel circuit 30 includes: a fourth switch circuit 301, a fifth switch circuit 302, a sixth switch circuit 303, a second driving circuit 304, a second light emitting control circuit 305, and a second charge storage device 306;

- a control end of the fourth switch circuit 301 is electrically connected to the third control signal line, a first end of the fourth switch circuit 301 is electrically connected to the second data signal line D_2, and a second end of the fourth switch circuit 301 is electrically connected to a third node C;
- a control end of the fifth switch circuit 302 is electrically connected to the fourth control signal line, a first end of the fifth switch circuit 302 is electrically connected to the first initialization signal line Vref1, and a second end of the fifth switch circuit 302 is electrically connected to the third node C;
- a control end of the sixth switch circuit 303 is electrically connected to the fifth control signal line, a first end of the sixth switch circuit 303 is electrically connected to the second initialization signal line Vref2, and a second end of the sixth switch circuit 303 is electrically connected to a fourth node D;
- the fourth node D is electrically connected to an anode of a second light emitting device, and a cathode of the second light emitting device is electrically connected to the second level end VSS;
- a control end of the second driving circuit 304 is electrically connected to the third node C, a first end of the second driving circuit 304 is electrically connected to a second end of the first light emitting control circuit 205, and a second end of the second driving circuit 304 is electrically connected to the fourth node D;
- a control end of the second light emitting control circuit 305 is electrically connected to the light emitting control signal line EM, and a first end of the second light emitting control circuit 305 is electrically connected to the first level end VDD; and
- a first end of the second charge storage device 306 is electrically connected to the third node C, and a second end of the second charge storage device 306 is electrically connected to the fourth node D.

In some embodiments, as shown in FIG. 3, the first switch circuit 201 includes a third switch device G3, a control end of the third switch device G3 serves as the control end of the first switch circuit 201, a first end of the third switch device G3 serves as the first end of the first switch circuit 201, and a second end of the third switch device G3 serves as the second end of the first switch circuit 201;

- the second switch circuit 202 includes a fourth switch device G4, a control end of the fourth switch device G4 serves as the control end of the second switch circuit 202, a first end of the fourth switch device G4 serves as the first end of the second switch circuit 202, and a second end of the fourth switch device G4 serves as the second end of the second switch circuit
- the third switch circuit 203 includes a fifth switch device G5, a control end of the fifth switch device G5 serves as the control end of the third switch circuit 203, a first end of the fifth switch device G5 serves as the first end of the third switch circuit 203, and a second end of the fifth switch device G5 serves as the second end of the third switch circuit 203;
- the first driving circuit 204 includes a sixth switch device G6, a control end of the sixth switch device G6 serves as the control end of the first driving circuit 204, a first end of the sixth switch device G6 serves as the first end of the first driving circuit 204, and a second end of the sixth switch device G6 serves as the second end of the first driving circuit 204;
- the first light emitting control circuit 205 includes a seventh switch device G7, a control end of the seventh switch device G7 serves as the control end of the first light emitting control circuit 205, a first end of the seventh switch device G7 serves as the first end of the first light emitting control circuit 205, and a second end of the seventh switch device G7 serves as the second end of the first light emitting control circuit 205; and the first charge storage device 206 includes a first capacitor C1, a first end of the first capacitor C1 serves as the first end of the first charge storage device 206, and a second end of the first capacitor C1 serves as the second end of the first charge storage device 206.

In some embodiments, as shown in FIG. 3, the fourth switch circuit 301 includes an eighth switch device G8, a control end of the eighth switch device G8 serves as the control end of the fourth switch circuit 301, a first end of the eighth switch device G8 serves as the first end of the fourth switch circuit 301, and a second end of the eighth switch device G8 serves as the second end of the fourth switch circuit 301;

the fifth switch circuit 302 includes a ninth switch device G9, a control end of the ninth switch device G9 serves as the control end of the fifth switch circuit 302, a first end of the ninth switch device G9 serves as the first end of the fifth switch circuit 302, and a second end of the ninth switch device G9 serves as the second end of the fifth switch circuit 302;

the sixth switch circuit 303 includes a tenth switch device G10, a control end of the tenth switch device G10 serves as the control end of the sixth switch circuit 303, a first end of the tenth switch device G10 serves as the first end of the sixth switch circuit 303, and a second end of the tenth switch device G10 serves as the second end of the sixth switch circuit 303;

the second driving circuit 304 includes an eleventh switch device G11, a control end of the eleventh switch device G11 serves as the control end of the second driving circuit 304, a first end of the eleventh switch device G11 serves as the first end of the second driving circuit 304, and a second end of the eleventh switch device G11 serves as the second end of the second driving circuit 304;

the second light emitting control circuit 305 includes a twelfth switch device G12, a control end of the twelfth switch device G12 serves as the control end of the second light emitting control circuit 305, a first end of the twelfth switch device G12 serves as the first end of the second light emitting control circuit 305, and a second end of the twelfth switch device G12 serves as the second end of the second light emitting control circuit 305; and the second charge storage device 306 includes a second capacitor C2, a first end of the second capacitor C2 serves as the first end of the second charge storage device 306, and a second end of the second capacitor C2 serves as the second end of the second charge storage device 306.

In some embodiments, the switch devices are all thin film transistors; the control ends of the switch devices are gates of the thin film transistors; if the first ends of the switch devices are drain electrodes of the thin film transistors, the second ends of the switch devices are source electrodes of the thin film transistors; or if the first ends of the switch devices are source electrodes of the thin film transistors, the second ends of the switch devices are drain electrodes of the thin film transistors.

Figure 4:
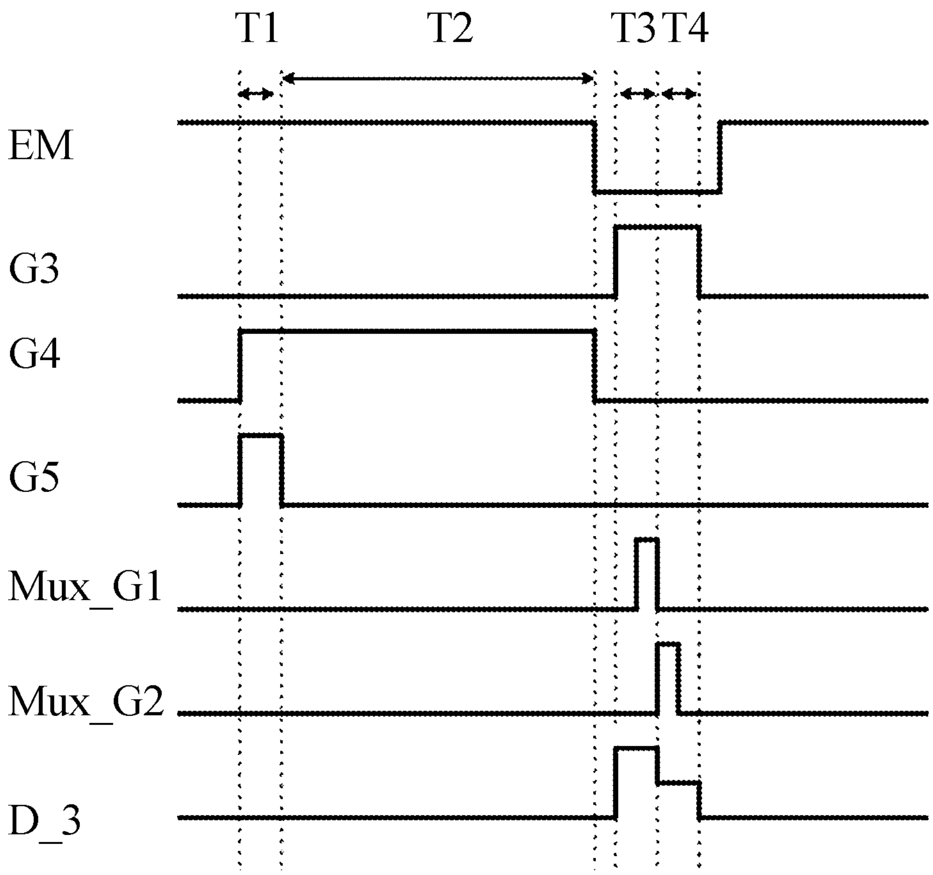
FIG. 4 is a time sequence diagram of a driving method of a pixel circuit of a display substrate provided by an embodiment of the present disclosure.

Based on the pixel circuits shown in FIG. 3, as shown in FIG. 4, a driving method of the pixel circuits is as follows.

A first stage T1 is a reset stage, the first ends and second ends of the second switch circuit 202 and the fifth switch circuit 302 are conducted, the first ends and second ends of the third switch circuit 203 and the sixth switch circuit 303 are conducted, first initialization signals received by the first ends of the second switch circuit 202 and the fifth switch circuit 302 are respectively output to the first node A and the third node C, and second initialization signals received by the first ends of the third switch circuit 203 and the sixth switch circuit 303 are respectively output to the third node C and the fourth node D.

Specifically, the fourth switch device G4 and the ninth switch device G9 are conducted, the fifth switch device G5 and the tenth switch device G10 are conducted, the fourth switch device G4 and the ninth switch device G9 respectively output the first initialization signals received by the first ends thereof and output by the first initialization signal lines Vref1 to the first node A and the third node C, and the fifth switch device G5 and the tenth switch device G10 respectively output the second initialization signals received by the first ends thereof and output by the second initialization signal lines Vref2 to the second node B and the fourth node D.

A second stage T2 is a compensation stage, the first ends and second ends of the second switch circuit 202 and the fifth switch circuit 302 maintain conducted, the first ends and second ends of third switch circuit 203 and the sixth switch circuit 303 are turned off, the first ends and second ends of the first driving circuit 204 and the second driving circuit 304 are conducted, and the third node C and the fourth node D are charged until a voltage difference between the first node A and the third node C reach a threshold voltage of the first driving circuit 204 and a voltage difference between the second node B and the fourth node D reach a threshold voltage of the second driving circuit 304.

Specifically, the fourth switch device G4 and the ninth switch device G9 maintain conducted, the fifth switch device G5 and the tenth switch device G10 are turned off, the sixth switch device G6 and the eleventh switch device G11 are conducted, and the second node B and the fourth node D are charged until a voltage difference between the first node A and the second node B reach a threshold voltage of the sixth switch device G6 and a voltage difference between the third node C and the fourth node D reach a threshold voltage of the eleventh switch device G11.

A third stage T3 is a data writing stage, the first ends and second ends of the first switch circuit 201 and the fourth switch device 301 are conducted, the first ends and second ends of the second switch circuit 202 and the fifth switch circuit 302 are turned off, the first ends and second ends of the first light emitting control circuit 205 and the second light emitting control circuit 305 are turned off, the first switch device Mux_G1 is controlled to be conducted and the second switch device Mux_G2 is controlled to be turned off, the first data signal is output to the first node A, the second switch device Mux_G2 is controlled to be conducted and the first switch device Mux_G1 is controlled to be turned off, and the second data signal is output to the second node B.

Specifically, the third switch device G3 and the eighth switch device G8 are conducted, the fourth switch device G4 and the ninth switch device G9 are cut off, and the seventh switch device G7 and the twelfth switch device G12 are cut off, the first switch device Mux_G1 is controlled to be conducted and the second switch device Mux_G2 is controlled to be turned off, the first data signal is output to the first node A, the second switch device Mux_G2 is controlled to be conducted and the first switch device Mux_G1 is controlled to be turned off, and the second data signal is output to the second node B.

Specifically, voltages of the first data signal and the second data signal are different.

A fourth stage T4 is a light emitting stage, the first ends and second ends of the first switch circuit 201 and the fourth switch device 301 are turned off, the first switch device Mux_G1 and the second switch device Mux_G2 are turned off, and the first ends and second ends of the first light emitting control circuit 205 and the second light emitting control circuit 305 are conducted, so as to drive the first light emitting device and the second light emitting device to emit light.

Specifically, the third switch device G3 and the eighth switch device G8 are cut off, the first switch device Mux_G1 and the second switch device Mux_G2 are turned off, and the seventh switch device G7 and the twelfth switch device G12 are conducted, so as to drive the first light emitting device and the second light emitting device to emit light.

Based on the same inventive concept, embodiments of the present disclosure further provide a display apparatus, including the display substrate 100 provided by the embodiments of the present disclosure.

Based on the same inventive concept, embodiments of the present disclosure further provide a design method of a display substrate, applied to the display substrate 100 provided by the embodiments of the present disclosure, and including: determining, according to a design data payload of each region in pixel circuits, a channel width-to-length ratio of each of switch devices in a data switching circuit corresponding to the each region.

Figure 5:
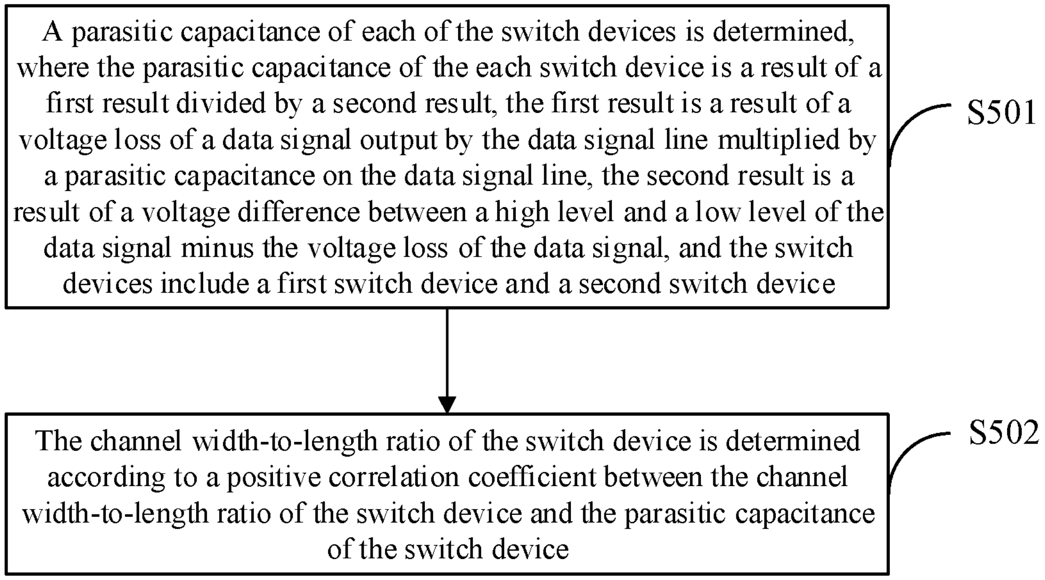
FIG. 5 is a flow chart of a method for determining a channel width-to-length ratio of a switch device provided by an embodiment of the present disclosure.

Specifically, as shown in FIG. 5, the method includes the following steps.

S501, a parasitic capacitance of each of the switch devices is determined, where the parasitic capacitance of the each switch device is a result of a first result divided by a second result, the first result is a result of a voltage loss of a data signal output by the data signal line multiplied by a parasitic capacitance on the data signal line, the second result is a result of a voltage difference between a high level and a low level of the data signal minus the voltage loss of the data signal, and the switch devices include a first switch device Mux_G1 and a second switch device Mux_G2.

Optionally, according to formula (2) of the embodiments of the present disclosure, the parasitic capacitance Cgs_tft of the switch device may be obtained. Because $\Delta U$, $\Delta VD$ and CD may all be obtained, the parasitic capacitance Cgs_tft may be obtained through calculation, and the channel width-to-length ratio of the switch device may be determined according to a preset positive correlation coefficient between the channel width-to-length ratio W/L of the switch device and the parasitic capacitance Cgs_tft of the switch device.

S502, the channel width-to-length ratio of the switch device is determined according to a positive correlation coefficient between the channel width-to-length ratio of the switch device and the parasitic capacitance of the switch device.

In practical application, the preset positive correlation coefficient is related to a manufacturing process of the switch device, and can be determined according to the actual manufacturing process of the switch device.

Those of skill in the art may understand that, steps, measures, and solutions in various operations, method, and procedures discussed in the present disclosure may be alternated, changed, combined or deleted. Further, other steps, measures, and solutions in the operations, method, and procedures discussed in the present disclosure may be alternated, changed, re-ranked, decomposed, combined or deleted. Further, steps, measures, and solutions in the operations, method, and procedures in the prior art disclosed in the present disclosure may also be alternated, changed, re-ranked, decomposed, combined or deleted.

Terms "first" and "second" are merely used for describe, and cannot be understood as implying or indicating relevant significance or implying the quantity of any indicated technical features. Therefore, a feature limited by "first" or "second" may explicitly or implicitly include one or more features. In the description of the present disclosure, unless other expressed, the meaning of "a plurality of" is two or more than two.

It should be understood that, although all steps in the flow chart in the accompanying drawings are displayed in a sequence indicated by arrows, such steps are not necessarily executed in the sequence indicated by arrows. Unless expressly stated herein, execution of these steps are not limited by any restrict sequence, and may be executed in other sequence. Further, at least a part of steps in the flow chart in the accompanying drawings may include a plurality of sub-steps or a plurality of stages, and these sub-steps or stages are not necessarily executed at the same moment, but may be executed at different moments. They may not necessarily be executed in sequence, but may be alternatively executed or executed in turns together with any other steps or at least a part of sub-steps or stages of other steps.

The above descriptions are merely a part of implementations of the present disclosure. It should be pointed out that, to those of ordinary skill in the art, several modifications and polishings may further be made without departing from the principles of the present disclosure, and such modifications and polishings should be deemed within the scope of protection of the present disclosure as well.

What is claimed is:

1. A display substrate, comprising:

pixel circuits arranged in an array, wherein the pixel circuits are arranged in at least two regions; and data switching circuits correspondingly connected to the pixel circuits in the at least two regions via data signal lines;

wherein a channel width-to-length ratio of each of switch devices in each of the data switching circuits is positively correlated with a design data payload of the region corresponding to the each data switching circuit;

wherein the design data payload of the region is positively correlated with a parasitic capacitance of each of the switch devices; and the parasitic capacitance of the each switch device is a result of a first result divided by a second result;

wherein the first result is a result of a voltage loss of a data signal output by a data signal line multiplied by a parasitic capacitance on the data signal line, and the second result is a result of a voltage difference between a high level and a low level of the data signal minus the voltage loss of the data signal.

2. The display substrate according to claim 1, wherein the display substrate is a specially shaped substrate; and the at least two regions in the specially shaped substrate comprise at least one of: different shapes, different areas or different curvatures.

3. The display substrate according to claim 1, wherein one of the at least two regions comprises at least two data signal lines;

one of the at least two data signal lines is electrically connected to one column of the pixel circuits;

one of the data switching circuits comprises at least two switch devices; and each of the at least two switch devices are equal in the channel width-to-length ratio.

4. The display substrate according to claim 3, wherein one of the at least two regions comprises: a first data signal line, a second data signal line, a first pixel circuit electrically connected to the first data signal line, and a second pixel circuit electrically connected to the second data signal line;

each of the data switching circuits comprises: a first switch device and a second switch device;

the first switch device is electrically connected to the first pixel circuit through the first data signal line; and the second switch device is electrically connected to the second pixel circuit through the second data signal line.

5. The display substrate according to claim 4, wherein a control end of the first switch device is electrically connected to a first control signal line, a first end of the first switch device is electrically connected to a data input line, and a second end of the first switch device is electrically connected to the first data signal line; and a control end of the second switch device is electrically connected to a second control signal line, a first end of the second switch device is electrically connected to the data input line, and a second end of the second switch device is electrically connected to the second data signal line.

6. The display substrate according to claim 3, wherein one of the pixel circuit comprises: a first switch circuit, a second switch circuit, a third switch circuit, a driving circuit, a light emitting control circuit, a charge storage device and a light emitting device;

a control end of the first switch circuit is electrically connected to a third control signal line, a first end of the first switch circuit is electrically connected to one of the at least two data signal lines, and a second end of the first switch circuit is electrically connected to a first node;

a control end of the second switch circuit is electrically connected to a fourth control signal line, a first end of the second switch circuit is electrically connected to a first initialization signal line, and a second end of the second switch circuit is electrically connected to the first node;

a control end of the third switch circuit is electrically connected to a fifth control signal line, a first end of the third switch circuit is electrically connected to a second initialization signal line, and a second end of the third switch circuit is electrically connected to a second node;

a control end of the driving circuit is electrically connected to the first node, a first end of the driving circuit is electrically connected to a second end of the light emitting control circuit, and a second end of the driving circuit is electrically connected to the second node;

a control end of the light emitting control circuit is electrically connected to a sixth control signal line, and a first end of the light emitting control circuit is electrically connected to a first level end;

a first end of the charge storage device is electrically connected to the first node, and a second end of the charge storage device is electrically connected to the second node; and an anode of the light emitting device is electrically connected to the second node, and a cathode of the light emitting device is electrically connected to a second level end.

7. The display substrate according to claim 6, wherein the first switch circuit comprises a third switch device, a control end of the third switch device serves as the control end of the first switch circuit, a first end of the third switch device serves as the first end of the first switch circuit, and a second end of the third switch device serves as the second end of the first switch circuit;

the second switch circuit comprises a fourth switch device, a control end of the fourth switch device serves as the control end of the second switch circuit, a first end of the fourth switch device serves as the first end of the second switch circuit, and a second end of the fourth switch device serves as the second end of the second switch circuit;

the third switch circuit comprises a fifth switch device, a control end of the fifth switch device serves as the control end of the third switch circuit, a first end of the fifth switch device serves as the first end of the third switch circuit, and a second end of the fifth switch device serves as the second end of the third switch circuit;

the driving circuit comprises a sixth switch device, a control end of the sixth switch device serves as the control end of the driving circuit, a first end of the sixth switch device serves as the first end of the driving circuit, and a second end of the sixth switch device serves as the second end of the driving circuit;

the light emitting control circuit comprises a seventh switch device, a control end of the seventh switch device serves as the control end of the light emitting control circuit, a first end of the seventh switch device serves as the first end of the light emitting control circuit, and a second end of the seventh switch device serves as the second end of the light emitting control circuit; and the charge storage device comprises a capacitor, a first end of the capacitor serves as the first end of the charge storage device, and a second end of the capacitor serves as the second end of the charge storage device.

8. The display substrate according to claim 7, wherein each switch device is a thin film transistor;

the control end of each switch devices is a gate of the thin film transistor; and the first end of each switch device is a drain electrode of the thin film transistor, and the second end of each switch device is a source electrode of the thin film transistor; or the first end of each switch device is a source electrode of the thin film transistor, and the second end of each switch device is a drain electrode of the thin film transistor.

9. A display apparatus, comprises the display substrate according to claim 1.

10. The display apparatus according to claim 9, wherein the display substrate is a specially shaped substrate; and the at least two regions in the specially shaped substrate comprise at least one of: different shapes, different areas or different curvatures.

11. The display apparatus according to claim 9, wherein one of the at least two regions comprises at least two data signal lines;

one of the at least two data signal lines is electrically connected to one column of the pixel circuits;

one of the data switching circuits comprises at least two switch devices; and each of the at least two switch devices are equal in the channel width-to-length ratio.

12. The display apparatus according to claim 11, wherein one of the at least two regions comprises: a first data signal line, a second data signal line, a first pixel circuit electrically connected to the first data signal line, and a second pixel circuit electrically connected to the second data signal line;

each of the data switching circuits comprises: a first switch device and a second switch device;

the first switch device is electrically connected to the first pixel circuit through the first data signal line; and the second switch device is electrically connected to the second pixel circuit through the second data signal line.

13. The display apparatus according to claim 12, wherein a control end of the first switch device is electrically connected to a first control signal line, a first end of the first switch device is electrically connected to a data input line, and a second end of the first switch device is electrically connected to the first data signal line; and a control end of the second switch device is electrically connected to a second control signal line, a first end of the second switch device is electrically connected to the data input line, and a second end of the second switch device is electrically connected to the second data signal line.

14. The display apparatus according to claim 11, wherein one of the pixel circuit comprises: a first switch circuit, a second switch circuit, a third switch circuit, a driving circuit, a light emitting control circuit, a charge storage device and a light emitting device;

a control end of the first switch circuit is electrically connected to a third control signal line, a first end of the first switch circuit is electrically connected to one of the at least two data signal lines, and a second end of the first switch circuit is electrically connected to a first node;

a control end of the second switch circuit is electrically connected to a fourth control signal line, a first end of the second switch circuit is electrically connected to a first initialization signal line, and a second end of the second switch circuit is electrically connected to the first node;

a control end of the third switch circuit is electrically connected to a fifth control signal line, a first end of the third switch circuit is electrically connected to a second initialization signal line, and a second end of the third switch circuit is electrically connected to a second node;

a control end of the driving circuit is electrically connected to the first node, a first end of the driving circuit is electrically connected to a second end of the light emitting control circuit, and a second end of the driving circuit is electrically connected to the second node;

a control end of the light emitting control circuit is electrically connected to a sixth control signal line, and a first end of the light emitting control circuit is electrically connected to a first level end;

a first end of the charge storage device is electrically connected to the first node, and a second end of the charge storage device is electrically connected to the second node; and an anode of the light emitting device is electrically connected to the second node, and a cathode of the light emitting device is electrically connected to a second level end.

15. The display apparatus according to claim 14, wherein the first switch circuit comprises a third switch device, a control end of the third switch device serves as the control end of the first switch circuit, a first end of the third switch device serves as the first end of the first switch circuit, and a second end of the third switch device serves as the second end of the first switch circuit;

the second switch circuit comprises a fourth switch device, a control end of the fourth switch device serves as the control end of the second switch circuit, a first end of the fourth switch device serves as the first end of the second switch circuit, and a second end of the fourth switch device serves as the second end of the second switch circuit;

the third switch circuit comprises a fifth switch device, a control end of the fifth switch device serves as the control end of the third switch circuit, a first end of the fifth switch device serves as the first end of the third switch circuit, and a second end of the fifth switch device serves as the second end of the third switch circuit;

the driving circuit comprises a sixth switch device, a control end of the sixth switch device serves as the control end of the driving circuit, a first end of the sixth switch device serves as the first end of the driving circuit, and a second end of the sixth switch device serves as the second end of the driving circuit;

the light emitting control circuit comprises a seventh switch device, a control end of the seventh switch device serves as the control end of the light emitting control circuit, a first end of the seventh switch device serves as the first end of the light emitting control circuit, and a second end of the seventh switch device serves as the second end of the light emitting control circuit; and the charge storage device comprises a capacitor, a first end of the capacitor serves as the first end of the charge storage device, and a second end of the capacitor serves as the second end of the charge storage device.

16. The display apparatus according to claim 15, wherein each switch device is a thin film transistor;

the control end of each switch devices is a gate of the thin film transistor; and the first end of each switch device is a drain electrode of the thin film transistor, and the second end of each switch device is a source electrode of the thin film transistor; or the first end of each switch device is a source electrode of the thin film transistor, and the second end of each switch device is a drain electrode of the thin film transistor.

17. A design method of the display substrate according to claim 1, comprising:

determining, according to a design data payload of each of the at least two regions in the pixel circuits, the channel width-to-length ratio of each of the switch devices in a data switching circuit corresponding to the each region.

18. The design method according to claim 17, wherein the determining the channel width-to-length ratio of the each switch device in the data switching circuit corresponding to the each region comprises:

determining a parasitic capacitance of the each switch device, wherein the switch devices comprise a first switch device and a second switch device; and determining the width-to-length ratio of the each switch device according to a positive correlation coefficient between the channel width-to-length ratio of the each switch device and the parasitic capacitance of the each switch device.

* * * * *